(12) United States Patent
Sylvester et al.

(10) Patent No.: US 10,583,875 B2
(45) Date of Patent: Mar. 10, 2020

(54) AUTOMOTIVE DECKLID SPOILER WITH AERODYNAMICALLY SHAPED AIRFOIL SECTIONS

(71) Applicant: Ford Global Technologies, LLC, Dearborn, MI (US)

(72) Inventors: Michael Stephen Sylvester, Berkley, MI (US); Matthew Arthur Titus, Livonia, MI (US); Andrew Thomas Cunningham, Royal Oak, MI (US); Joseph Ovalles Quinones, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 52 days.

(21) Appl. No.: 15/619,634

(22) Filed: Jun. 12, 2017

(65) Prior Publication Data

US 2018/0354565 A1 Dec. 13, 2018

(51) Int. Cl.
*B62D 35/00* (2006.01)
*B62D 37/02* (2006.01)

(52) U.S. Cl.
CPC ............ *B62D 35/007* (2013.01); *B62D 37/02* (2013.01)

(58) Field of Classification Search
CPC .............................. B62D 35/007; B62D 37/02

USPC ....................................................... 296/180.1
See application file for complete search history.

(56) References Cited

U.S. PATENT DOCUMENTS

| | | | |
|---|---|---|---|
| 4,688,840 A | 8/1987 | Kretschmer | |
| 5,678,884 A * | 10/1997 | Murkett | B60K 13/02 296/180.1 |
| 5,934,740 A | 8/1999 | Moebius et al. | |
| 7,111,898 B2 * | 9/2006 | Rinklin | B62D 35/007 296/180.1 |
| 2011/0001329 A1 * | 1/2011 | Froeschle | B60J 1/2008 296/76 |

FOREIGN PATENT DOCUMENTS

| | | |
|---|---|---|
| CN | 104210565 A | 12/2014 |
| CN | 104859730 A | 8/2015 |

\* cited by examiner

*Primary Examiner* — Joseph D. Pape
*Assistant Examiner* — Dana D Ivey
(74) *Attorney, Agent, or Firm* — David Coppiellie; Carlson, Gaskey & Olds, P.C.

(57) ABSTRACT

An apparatus and method, according to an exemplary aspect of the present disclosure includes, among other things, providing a spoiler body having a plurality of tunnels defining an open area between the spoiler body and a vehicle exterior surface. Each tunnel has an uppermost wall having an airfoil section. The spoiler body includes at least one vehicle attachment area that is positioned between at least two of the tunnels.

26 Claims, 3 Drawing Sheets

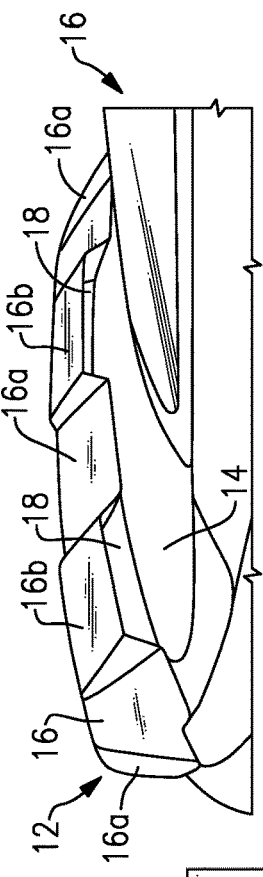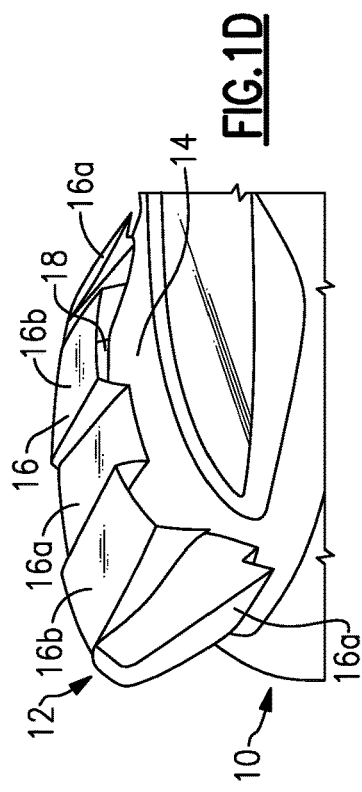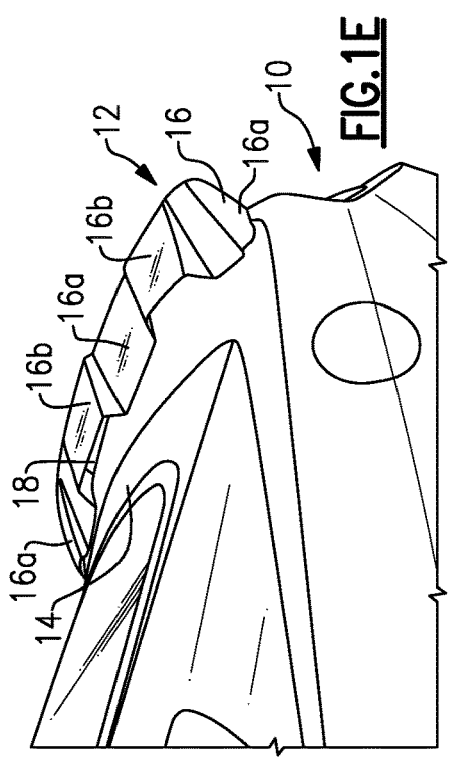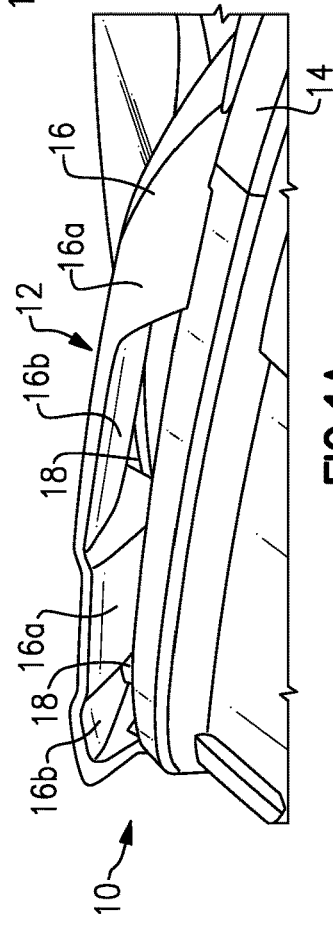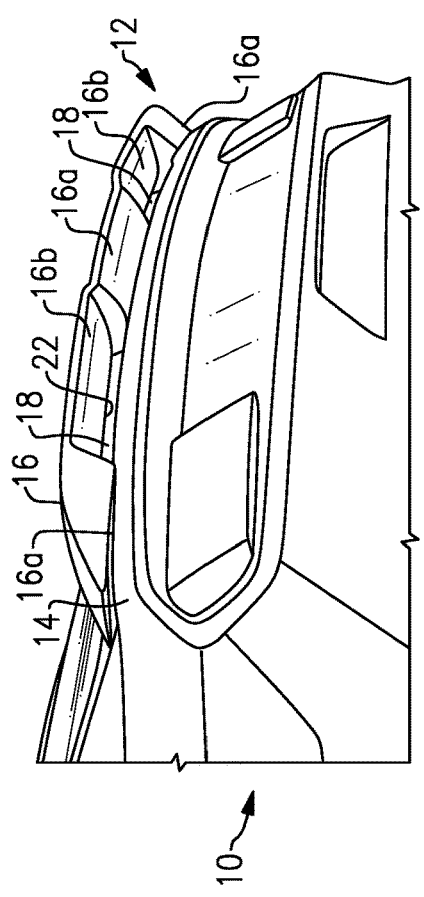

AUTOMOTIVE DECKLID SPOILER WITH AERODYNAMICALLY SHAPED AIRFOIL SECTIONS

TECHNICAL FIELD

This disclosure relates to an exemplary apparatus and method of providing a spoiler for a vehicle that includes tunnels having an airfoil section.

BACKGROUND

Vehicles, such as high performance vehicles for example, often include spoilers that are mounted to the vehicle to improve aerodynamic performance. Spoilers can be attached to a back of the vehicle, such as on a decklid for example, or can be located on a rear window or roof. The use of a spoiler improves airflow over and around the vehicle, which in turn creates better grip or traction on the road. Vehicles that run at higher speeds can encounter control issues because, under certain speed conditions, the increased airflow can create lift.

With regard to engineering requirements for aerodynamics, decklid spoilers on high performance vehicles are typically inefficient or sub-optimal for lift versus drag ratio due to various factors. For example, decklid spoilers typically have reduced surface area upon which negative lift, i.e. downforce, can be generated. Further, these types of spoilers rely on inefficient high-pressure creation due to a wedge placed in the airstream. Thus for traditional spoilers, it is difficult to generate high amounts of downforce for an efficient amount of drag. Drag reduction is vital in order to meet fuel economy, acceleration, and maximum velocity targets.

SUMMARY

An apparatus according to an exemplary aspect of the present disclosure includes, among other things, a spoiler body having a plurality of tunnels defining an open area between the spoiler body and a vehicle exterior surface. Each tunnel has an uppermost surface having an airfoil section. The spoiler body includes at least one vehicle attachment area that is positioned between at least two of the tunnels.

In a further non-limiting embodiment of the foregoing apparatus, the airfoil section is at an angle of attack of three to fifteen degrees relative to a free stream airflow over the airfoil section.

In a further non-limiting embodiment of either of the foregoing apparatus, the airfoil section has a suction side facing the vehicle exterior surface, a pressure side facing opposite the suction side, and a leading edge extending to a trailing edge to define a direction of airflow.

In a further non-limiting embodiment of any of the foregoing apparatus, the open area between the spoiler body and the exterior surface is at a lower pressure than an area above the outermost wall as air flows over the airfoil section.

In a further non-limiting embodiment of any of the foregoing apparatus, the plurality of tunnels comprises only first and second tunnels.

In a further non-limiting embodiment of any of the foregoing apparatus, the at least one vehicle attachment area comprises at least a first attachment area between the first and second tunnels, a second attachment area at one lateral end of the spoiler body, and a third attachment area at an opposite lateral end of the spoiler body.

In a further non-limiting embodiment of any of the foregoing apparatus, the spoiler body has a length extending between the lateral ends and a width extending in a longitudinal direction, the length being greater than the width.

In a further non-limiting embodiment of any of the foregoing apparatus, the open area of each tunnel is defined by a length and a height, and the open area is uninterrupted in the longitudinal direction from a tunnel inlet to a tunnel outlet.

In a further non-limiting embodiment of any of the foregoing apparatus, the spoiler body comprises a plurality of two dimensional portions corresponding to the vehicle attachment areas and a plurality of three dimensional portions corresponding to the tunnels.

In a further non-limiting embodiment of any of the foregoing apparatus, at least one attachment area comprises a plurality of attachment areas that each have an inner surface fixed to the vehicle exterior surface and an outer surface, and wherein the outermost wall of each tunnel extends vertically outwardly relative to the outer surface to define the open area.

In a further non-limiting embodiment of any of the foregoing apparatus, wherein each tunnel includes a pair of laterally spaced side walls that connect the outermost wall to the outer surface of attachment areas positioned on either side of the tunnel.

In a further non-limiting embodiment of any of the foregoing apparatus, the plurality of attachment areas comprise at least a first attachment area between first and second tunnels, a second attachment area at one lateral end of the spoiler body, and a third attachment area at an opposite lateral end of the spoiler body such that the only airflow between the spoiler body and the vehicle exterior surface is through the first and second tunnels.

In a further non-limiting embodiment of any of the foregoing apparatus, the spoiler body has a leading edge and a trailing edge, and wherein the open area of each tunnel is uninterrupted through the spoiler body from the leading edge to the trailing edge.

An apparatus according to another exemplary aspect of the present disclosure includes, among other things, an aerodynamic structure for a vehicle comprising a spoiler body having at least first and second tunnels defining an open area between the spoiler body and a vehicle surface. Each tunnel has an uppermost wall having an airfoil section, and the spoiler body includes at least a first attachment area that is positioned between the first and second tunnels and is configured to attach the spoiler body to the vehicle.

In a further non-limiting embodiment of any of the foregoing apparatus, the airfoil section has a suction side facing the vehicle surface, a pressure side facing opposite the suction side, and a leading edge extending to a trailing edge to define a direction of airflow, and wherein the airfoil section is at an angle of attack of three to fifteen degrees relative to a free stream airflow over the airfoil section.

In a further non-limiting embodiment of any of the foregoing apparatus, there is a second attachment area at one lateral end of the spoiler body and a third attachment area at an opposite lateral end of the spoiler body such that the only airflow between the spoiler body and the vehicle exterior surface is through the first and second tunnels.

In a further non-limiting embodiment of any of the foregoing apparatus, the first tunnel includes a first pair of laterally spaced side walls that connect the uppermost wall to the first and second attachment areas, and wherein the second tunnel includes a second pair of laterally spaced side walls that connect the uppermost wall to the first and third attachment areas.

A method according to another exemplary aspect of the present disclosure includes the steps of, among other things: forming a spoiler body to include a plurality of tunnels configured to define an open area between the spoiler body and a vehicle exterior surface; and forming an uppermost wall of each tunnel with an airfoil section; forming at least one vehicle attachment area in the spoiler body at a location that is positioned between at least two of the tunnels.

In a further non-limiting embodiment of the foregoing method, the method includes forming the airfoil section to have an angle of attack of three to fifteen degrees relative to a free stream airflow over the airfoil section.

In a further non-limiting embodiment of either of the foregoing methods, the method includes forming the airfoil section to have a suction side facing the vehicle exterior surface, a pressure side facing opposite the suction side, and a leading edge extending to a trailing edge to define a direction of airflow.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1A is a rear perspective view of a spoiler from a passenger side of a vehicle.

FIG. 1B is a rear perspective view of the spoiler of FIG. 1A from a driver side of a vehicle.

FIG. 1C is a front perspective view of the spoiler of FIG. 1A from a passenger side of a vehicle.

FIG. 1D is an enlarged view of the spoiler from FIG. 1C.

FIG. 1E is a front perspective view of the spoiler of FIG. 1A from a driver side of a vehicle.

DETAILED DESCRIPTION

Figure 2:
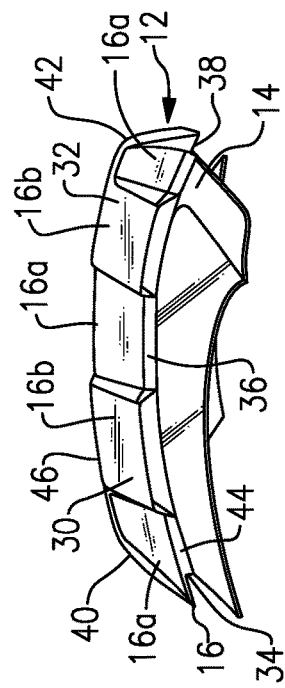
FIG. 2 is a front view of the spoiler of FIG. 1A.

This disclosure details exemplary apparatus and methods of providing a spoiler for a vehicle that includes tunnels having an airfoil section. These and other features are discussed in greater detail in the following paragraphs of this detailed description.

FIGS. 1A-1E show one example of a vehicle 10 including a spoiler 12 that is mounted to a decklid 14 of the vehicle 10. The spoiler 12 improves airflow over and around the vehicle 10 and accordingly creates increased traction on the road for improved control. The spoiler 12 includes a body 16 with spoiler sections 16a and bleed through sections or tunnels 16b. The spoiler sections 16a are two dimensional (2D) while the tunnels 16b are three-dimensional (3D), i.e. aeroelements.

The tunnels 16b define an open area 18 that is between an exterior surface 20 of the decklid 14 and a lower surface 22 (FIG. 1B) of the spoiler body 16. Air flows over the spoiler body 16 and through the open areas 18 during vehicle operation. Flow through the open areas 18 creates a negative lift resulting in a downward force Fl (FIG. 6) on the vehicle. This will be discussed in greater detail below.

FIG. 2 shows an example of a spoiler body 16 that only includes a first tunnel 30 and a second tunnel 32 and a plurality of attachment areas 34, 36, 38 to attach the spoiler 12 to the decklid 14. In one example, the attachment areas 34, 36, 38 comprise support stanchions. As discussed above, the spoiler body 16 is comprised of two dimensional spoiler sections 16a and three dimensional sections 16b. The two dimensional spoiler sections 16a correspond to the vehicle attachment areas 34, 36, 38, and the three dimensional sections 16b correspond to the first 30 and second 32 tunnels.

Figure 4:
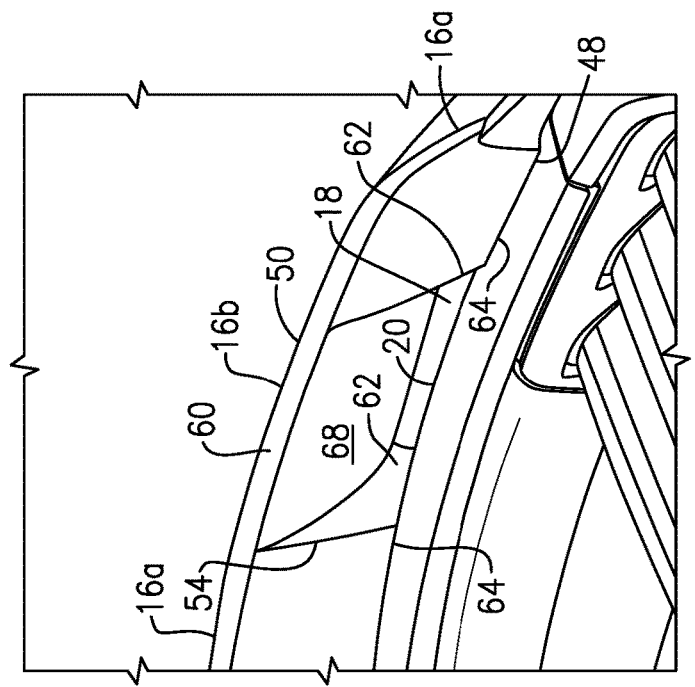
FIG. 4 is an enlarged view of a tunnel of FIG. 3 as viewed from the rear.
Figure 3:
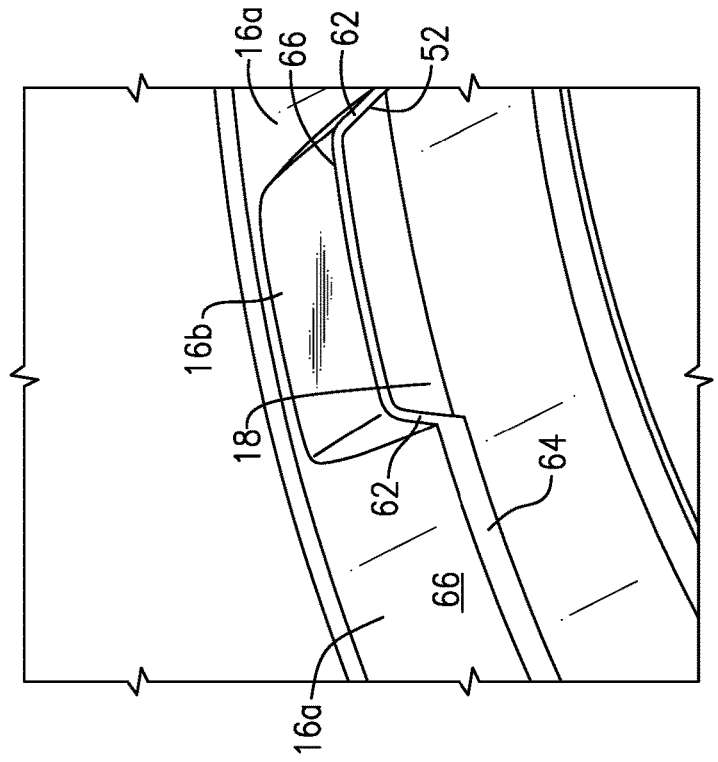
FIG. 3 is an enlarged view of a tunnel from the spoiler of FIG. 2 as viewed from the front.

As shown in FIGS. 2-4, the spoiler body 16 extends laterally between a first end 40 and a second end 42 in direction that is across a width of the vehicle 10. The spoiler body 16 extends longitudinally between a forward edge 44 and a rearward edge 46 in a direction that is along a length of the vehicle. The spoiler body 16 extends vertically between a lowermost surface 48 and an uppermost surface 50 in a direction that is along a height of the vehicle 10. The first 30 and second 32 tunnels define open areas 18 to allow air flow through the tunnels 30, 32 between the spoiler body 16 and the decklid 14. In one example, the open area 18 of each tunnel 30, 32 is defined by a length and a height, and the open area 18 is uninterrupted in the longitudinal direction from a tunnel inlet 52 to a tunnel outlet 54.

As shown in FIGS. 3-4, each tunnel includes an uppermost wall 60 and a pair of side walls 62 that connect the uppermost wall 60 to the spoiler sections 16a on each side of the tunnel. The tunnel open area 18 is thus defined between a bottom surface 68 of the uppermost wall 60, the side walls 62, and the exterior surface 20 of the decklid 14.

Figure 5:
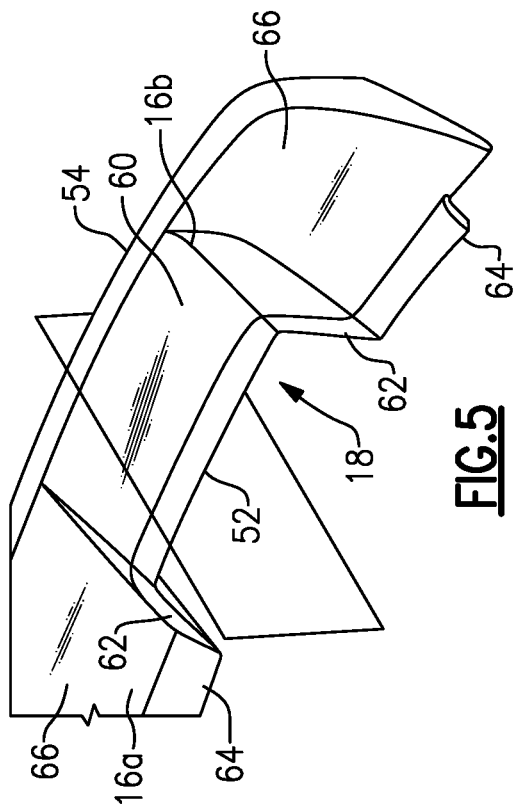
FIG. 5 is an enlarged view of a tunnel and an attachment area of the spoiler viewed from the front.

The spoiler sections 16a each have an inner surface 64 that is fixed to the exterior surface 20 of the decklid 14 and an outer surface 66 that faces opposite the inner surface 64. As best shown in FIG. 5, the outer surface 66 comprises a solid curved surface that extends upwardly from the forward edge 44 to the rearward edge 46. In one example, the lower surface 64 of the attachment areas 34, 36, 38 for the respective spoiler sections 16a is fixed to the exterior surface 20 across its entire width such that there are no gaps for air flow in a longitudinal direction at the attachment areas 34, 36, 38. Any type of attachment method can be used to fix the attachment areas 34, 36, 38 of the spoiler 12 to the vehicle 10, including fasteners, adhesive, etc.

Figure 6:
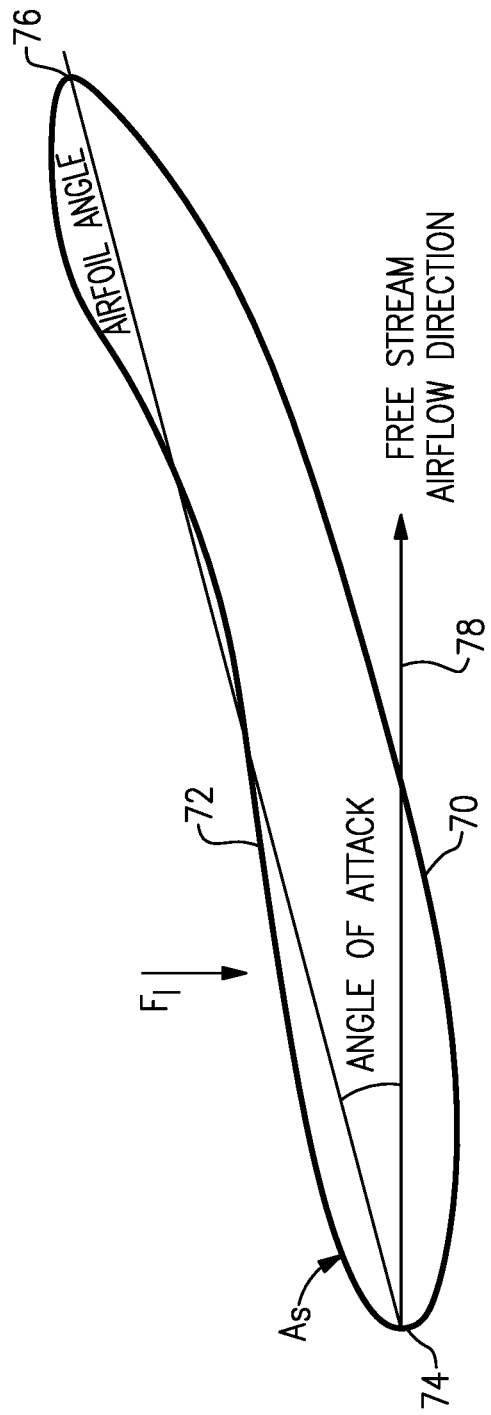
FIG. 6 is a section view of the tunnel of FIG. 5.

FIG. 6 shows a section through the uppermost wall 60 of the tunnels. The uppermost wall 60 has an airfoil section AS that is defined by a suction side 70 facing the vehicle exterior surface 20, a pressure side 72 facing opposite the suction side 70, and a leading edge 74 extending to a trailing edge 76 to define a direction of air flow. A free stream air flow direction is shown at 78, and the airfoil section AS is orientated such that an angle of attack 80 with respect to the free stream air flow direction 78 is within a range of three to fifteen degrees. This results in a generation of low pressure (lower than ambient air) on an underside of the airfoil section wall 60 and a high pressure (higher than ambient air)

above the airfoil section wall 60, which accordingly generates negative lift or a downforce F1.

As discussed above, FIG. 2 shows an example where there are first 30 and second 32 tunnels in combination with three attachment areas 34, 36, 38. The first attachment area 34 is at the first lateral end 40 and extends to the first tunnel 30. The second attachment area 36 extends between the first 30 and second 32 tunnels. The third attachment area 38 extends from the second tunnel 32 to the second lateral end 42. This configuration provides a pair of airfoil-shaped tunnels 30, 32 that are more aerodynamically efficient for lift and drag as compared to traditional spoiler configurations.

In one example, the spoiler body 16 comprises a single-continuous, monolithic structure that is made from a plastic material. Any type of manufacturing process can be used to form the single continuous assembly plastic spoiler body 16, such as injection molding, vacuum forming, etc. In one example, the single continuous assembly plastic spoiler body 16 is formed from a blow molding process.

In another example, the spoiler body is formed from a plurality of pieces that are attached together. In one example, the spoiler body can be formed from plastic, carbon fiber, fiber glass, sheet molding compound (SMC) or other similar materials.

The subject invention combines 3D airfoil tunnels with 2D spoiler sections which increases the overall surface area over a standard 2D spoiler. Further, the bottom surface of the airfoil section accelerates the air, hence lowering the air pressure and creating downforce, without adding additional drag-inducing front area. This results in high levels of negative lift/downforce F1 with a low drag penalty. Further, combining 2D spoiler sections with 3D tunnel sections allows for polymer plastic materials to be used which are very cost effective. Additionally, these types of materials are inexpensive to manufacture compared to using composite materials which are labor intensive. Thus, the subject invention allows less expensive materials to be used while still producing downforce-generating tunnels.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a spoiler body having a plurality of tunnels defining an open area between the spoiler body and a vehicle exterior surface, wherein each tunnel has an uppermost wall having an airfoil section, and wherein the spoiler body includes at least one vehicle attachment area that is positioned between at least two of the tunnels.

2. The apparatus according to claim 1, wherein the airfoil section is at an angle of attack of three to fifteen degrees relative to a free stream airflow over the airfoil section.

3. The apparatus according to claim 1, wherein the airfoil section has a suction side facing the vehicle exterior surface, a pressure side facing opposite the suction side, and a leading edge extending to a trailing edge to define a direction of airflow.

4. The apparatus according to claim 1, wherein the open area between the spoiler body and the exterior surface is at a lower pressure than an area above the uppermost wall as air flows over the airfoil section.

5. The apparatus according to claim 1, wherein the plurality of tunnels comprises only first and second tunnels.

6. The apparatus according to claim 5, wherein the at least one vehicle attachment area comprises at least a first attachment area between the first and second tunnels, a second attachment area at one lateral end of the spoiler body, and a third attachment area at an opposite lateral end of the spoiler body.

7. The apparatus according to claim 6, wherein the spoiler body has a length extending between the lateral ends and a width extending in a longitudinal direction, the length being greater than the width.

8. The apparatus according to claim 7, wherein the open area of each tunnel is defined by a length and a height, and the open area is uninterrupted in the longitudinal direction from a tunnel inlet to a tunnel outlet.

9. The apparatus according to claim 1, wherein the spoiler body comprises a plurality of two dimensional portions corresponding to the vehicle attachment areas and a plurality of three dimensional portions corresponding to the tunnels.

10. The apparatus according to claim 1, wherein the at least one attachment area comprises a plurality of attachment areas that each have an inner surface fixed to the vehicle exterior surface and an outer surface, and wherein the uppermost wall of each tunnel extends vertically outwardly relative to the outer surface to define the open area.

11. The apparatus according to claim 10, wherein each tunnel includes a pair of laterally spaced side walls that connect the uppermost wall to the outer surface of attachment areas positioned on either side of the tunnel.

12. The apparatus according to claim 11, wherein the plurality of attachment areas comprise at least a first attachment area between first and second tunnels, a second attachment area at one lateral end of the spoiler body, and a third attachment area at an opposite lateral end of the spoiler body such that the only airflow between the spoiler body and the vehicle exterior surface is through the first and second tunnels.

13. The apparatus according to claim 1, wherein the spoiler body has a leading edge and a trailing edge, and wherein the open area of each tunnel is uninterrupted through the spoiler body from the leading edge to the trailing edge.

14. The apparatus according to claim 1, wherein the only airflow between the spoiler body and the vehicle exterior surface is through the tunnels.

15. The apparatus according to claim 1, wherein the airfoil section has a leading edge and a trailing edge, and wherein the airfoil section is orientated such that a free stream airflow enters the open area via a tunnel inlet at the leading edge and exits the open area via a tunnel outlet at the trailing edge to generate a negative lift force.

16. The apparatus according to claim 1, wherein the airfoil section has a leading edge and a trailing edge, and wherein the airfoil section is orientated such that a free stream airflow enters the open area via a tunnel inlet at the leading edge and exits the open area via a tunnel outlet at the trailing edge to generate a negative lift force.

17. An aerodynamic structure for a vehicle, comprising:
a spoiler body having at least first and second tunnels defining an open area between the spoiler body and a vehicle surface, wherein each tunnel has an uppermost wall having an airfoil section, and wherein the spoiler body includes at least a first attachment area that is positioned between the first and second tunnels and is configured to attach the spoiler body to the vehicle.

18. The aerodynamic structure according to claim 17, wherein the airfoil section has a suction side facing the vehicle surface, a pressure side facing opposite the suction side, and a leading edge extending to a trailing edge to define a direction of airflow, and wherein the airfoil section is at an angle of attack of three to fifteen degrees relative to a free stream airflow over the airfoil section.

19. The aerodynamic structure according to claim 17, including a second attachment area at one lateral end of the spoiler body and a third attachment area at an opposite lateral end of the spoiler body such that the only airflow between the spoiler body and a vehicle exterior surface is through the first and second tunnels.

20. The aerodynamic structure according to claim 19, wherein the first tunnel includes a first pair of laterally spaced side walls that connect the uppermost wall to the first and second attachment areas, and wherein the second tunnel includes a second pair of laterally spaced side walls that connect the uppermost wall to the first and third attachment areas.

21. The aerodynamic structure according to claim 17, wherein the open areas are defined between an inner surface of the uppermost wall of each tunnel and a vehicle exterior surface, and wherein air flows over the spoiler body and through the open areas during vehicle operation.

22. A method, comprising:
forming a spoiler body to include a plurality of tunnels configured to define an open area between the spoiler body and a vehicle exterior surface;
forming an uppermost wall of each tunnel with an airfoil section; and
forming at least one vehicle attachment area in the spoiler body at a location that is positioned between at least two of the tunnels.

23. The method according to claim 22, including forming the airfoil section to have an angle of attack of three to fifteen degrees relative to a free stream airflow over the airfoil section.

24. The method according to claim 22, including forming the airfoil section to have a suction side facing the vehicle exterior surface, a pressure side facing opposite the suction side, and a leading edge extending to a trailing edge to define a direction of airflow.

25. The method according to claim 22, wherein the only airflow between the spoiler body and the vehicle exterior surface is through the tunnels.

26. The method according to claim 22, wherein the airfoil section has a leading edge and a trailing edge, and wherein the airfoil section is orientated such that a free stream airflow enters the open area via a tunnel inlet at the leading edge and exits the open area via a tunnel outlet at the trailing edge to generate a negative lift force.

* * * * *